US012651197B2

(12) United States Patent
Cmielowski et al.

(10) Patent No.: US 12,651,197 B2
(45) Date of Patent: Jun. 9, 2026

(54) SELECTION OF A MACHINE LEARNING MODEL

(71) Applicant: International Business Machines Corporation, Armonk, NY (US)

(72) Inventors: Lukasz G. Cmielowski, Cracow (PL); Szymon Kucharczyk, Cracow (PL); Daniel Jakub Ryszka, Cracow (PL); Thomas Parnell, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 1132 days.

(21) Appl. No.: 17/358,505

(22) Filed: Jun. 25, 2021

(65) Prior Publication Data

US 2022/0414530 A1 Dec. 29, 2022

(51) Int. Cl.
G06N 20/00 (2019.01)

(52) U.S. Cl.
CPC .................................. G06N 20/00 (2019.01)

(58) Field of Classification Search
CPC ......... G06N 20/00; G06N 20/20; G06N 3/088
See application file for complete search history.

(56) References Cited

U.S. PATENT DOCUMENTS

| | | | |
|---|---|---|---|
| 12,051,009 B2 | 7/2024 | Vincent et al. | |
| 2010/0223211 A1* | 9/2010 | Johnson | G06Q 10/0637 |
| | | | 706/11 |
| 2012/0124351 A1* | 5/2012 | Egger | G06F 9/3897 |
| | | | 712/241 |

| | | | |
|---|---|---|---|
| 2016/0110657 A1 | 4/2016 | Gibiansky | |
| 2016/0358099 A1 | 12/2016 | Sturlaugson et al. | |
| 2018/0314980 A1* | 11/2018 | Osotio | G06N 20/00 |

(Continued)

FOREIGN PATENT DOCUMENTS

| | | |
|---|---|---|
| CN | 110503208 A | 11/2019 |
| CN | 111783867 A | 10/2020 |

(Continued)

OTHER PUBLICATIONS

International Search Report and Written Opinion, Dated Sep. 29, 2022, International Application No. PCT/IB2022/055687, International Filing Date Jun. 20, 2022, 7 pages.

(Continued)

*Primary Examiner* — Tewodros E Mengistu
(74) *Attorney, Agent, or Firm* — Michael O'Keefe

(57) ABSTRACT

A system may be configured to perform operations to select a machine learning model. The operations may include training machine learning models with training data of a training data set and obtaining a first value representing a first required runtime for training each machine learning model. The operations may include evaluating, based on the first value, a second value representing a second required runtime for training the machine learning model with a complete training data set. The operations may include calculating a final score for each machine learning model in a group of machine learning models, wherein the calculating is performed on a basis of the second values for the machine learning models, ranking the machine learning models based on the final score to obtain ranks, and selecting the machine learning model that has obtained a highest rank in the ranking.

9 Claims, 2 Drawing Sheets

200

(56) References Cited

U.S. PATENT DOCUMENTS

| | | | |
|---|---|---|---|
| 2019/0034518 A1* | 1/2019 | Liu | G06F 16/285 |
| 2020/0065712 A1 | 2/2020 | Wang | |
| 2020/0118036 A1* | 4/2020 | Karnagel | G06N 3/088 |
| 2020/0175354 A1 | 6/2020 | Volodarskiy | |
| 2020/0242400 A1 | 7/2020 | Perkins | |
| 2022/0092470 A1* | 3/2022 | Jaeger | G06N 20/00 |
| 2022/0101063 A1* | 3/2022 | Chau | G06N 3/082 |
| 2022/0230048 A1* | 7/2022 | Li | G06N 3/082 |
| 2024/0005129 A1* | 1/2024 | Zhou | G06N 3/0442 |
| 2024/0054590 A1 | 2/2024 | Takahashi et al. | |

FOREIGN PATENT DOCUMENTS

| | | |
|---|---|---|
| CN | 112243514 A | 1/2021 |
| JP | 2017-004509 A | 1/2017 |
| JP | 2021-064080 A | 10/2019 |
| JP | 2020-004409 A | 1/2020 |
| JP | 2020-515922 A | 5/2020 |
| JP | 2024-522437 A | 6/2024 |
| WO | 2018/183263 A2 | 10/2018 |
| WO | 2022/269448 A1 | 12/2022 |

OTHER PUBLICATIONS

Anonymous. "AutoAI Overview (Watson Machine Learning)." Printed Feb. 26, 2021. 3 pages. Published by IBM. https://www.ibm.com/support/producthub/icpdata/docs/content/SSQNUZ_latest/wsj/analyze-data/autoai-overview.html.

Anonymous. "Metrics and scoring: quantifying the quality of predictions." Printed May 13, 2021. 30 pages. Published by scikit-learn.org. https://scikit-learn.org/stable/modules/model_evaluation.html.

Anonymous. "Ranking and automatic selection of machine learning models." Published Jan. 3, 2018. 34 pages. Published by IP.com. https://priorart.ip.com/IPCOM/000252275.

Soumendra, "Choosing an ML estimator." Published Mar. 30, 2019. 10 pages. Published by Medium. https://medium.com/@soumendrak/choosing-an-ml-estimators-d85eaf015039.

* cited by examiner

SELECTION OF A MACHINE LEARNING MODEL

BACKGROUND

The present invention relates to the field of computer systems, and more specifically, to selecting a machine learning (ML) model out of a group of ML models on the basis of a training data set.

ML models are data files used by hardware and/or software entities or by hardware and/or software systems which run a dedicated software with the purpose to produce a specific kind of output when an input having a predetermined format is provided. The ML models are defined as composed of different stages, and the entirety of the stages are called a pipeline. Two different ML models differ in the definition of at least one of these stages. Internal parameter values for the ML models need to be defined. This is done via a training of the ML models where training data are used as inputs. Estimators may represent a first stage of the ML models, and the first stage transforms the input training data into a single value or into multiple values. A method of selecting an ML model out of a group of different ML models has the purpose to use, after training with suitable training data, an ML model that is optimal for a desired application.

Commonly, ML model selection is based on a value related to an accuracy of how tightly the real output of the ML models as to a specific input corresponds to what output is desired; this is oftentimes referred to as the "performance" of the model. For instance, ML models may be ranked by using values for the accuracy, and the one having the best (or highest) rank is chosen. A disadvantage thereof lies in that the process of selection as such might take too much time, or that the selected ML model is optimum as to accuracy but has other drawbacks. It would thus be desirable to provide an alternative approach to selecting the ML models.

SUMMARY

Various embodiments provide a method of selecting a machine learning, ML, model out of a group of ML models on the basis of a training data set that is configured to be used for training any one of the ML models out of the group of ML models, and a respective computer system and a respective computer program product, as described by the subject matter of the independent claims. Advantageous embodiments are described in the dependent claims. Embodiments of the present invention can be freely combined with each other if they are not mutually exclusive.

In one aspect, the invention relates to a method. The method may include calculating a final score for each one of the ML models, ranking the ML models based on the final score to obtain ranks, and selecting the ML model that has obtained the highest rank in the ranking. The method may include training each ML model out of the group of ML models or out of a subgroup thereof with respective training data of the training data set and obtaining a respective first value representing the runtime required for this training for each trained ML model. The method may include evaluating, by a predetermined predictive process, for each of the ML models for which the first value has been obtained and based on the respective first value, a second value representing a runtime required for training the ML model with the complete training data set, wherein the calculating of the final score for each one of the ML models is performed on the basis of the respectively evaluated second values for the ML models.

In another aspect, the invention relates to a computer system for machine learning, ML, by using a group of ML models and by using a respective training data set for training any one of the ML models out of the group of ML models, the computer system being configured to perform a method of selecting a machine learning, ML, model out of the group of ML models. The method may include calculating a final score for each one of the ML models, ranking the ML models based on the final score to obtain ranks, and selecting the ML model that has obtained the highest rank in the ranking.

The method may include training each ML model out of the group of ML models or out of a subgroup thereof with respective training data of the training data set and obtaining a respective first value representing the runtime required for this training for each trained ML model. The method may further include evaluating by a predetermined predictive process, for each of the ML models for which the first value has been obtained and based on the respective first value, a second value representing a runtime required for training the ML model with the complete training data set. The calculating of the final score for each one of the ML models may be performed on the basis of the respectively evaluated second values for the ML models.

In another aspect, the invention relates to a computer program product, the computer program product comprising a computer readable storage medium having program instructions embodied therewith, the program instructions being executable by a computer system to cause the computer system to act as a computer system for machine learning, ML, by using a group of ML models and by using a respective training data set for training any one of the ML models out of the group of ML models, the computer system being configured to perform a method of selecting a machine learning, ML, model out of the group of ML models. The method may include calculating a final score for each one of the ML models, ranking the ML models based on the final score to obtain ranks, and selecting the ML model that has obtained the highest rank in the ranking.

The method may include training each ML model out of the group of ML models or out of a subgroup thereof with respective training data of the training data set and obtaining a respective first value representing the runtime required for this training for each trained ML model. The method may further include evaluating by a predetermined predictive process, for each of the ML models for which the first value has been obtained and based on the respective first value, a second value representing a runtime required for training the ML model with the complete training data set. The calculating of the final score for each one of the ML models may be performed on the basis of the respectively evaluated second values for the ML models.

The above summary is not intended to describe each illustrated embodiment or every implement of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. The following embodiments of the invention are explained in detail, by way of example only, making reference to the following drawings.

Figure 1:
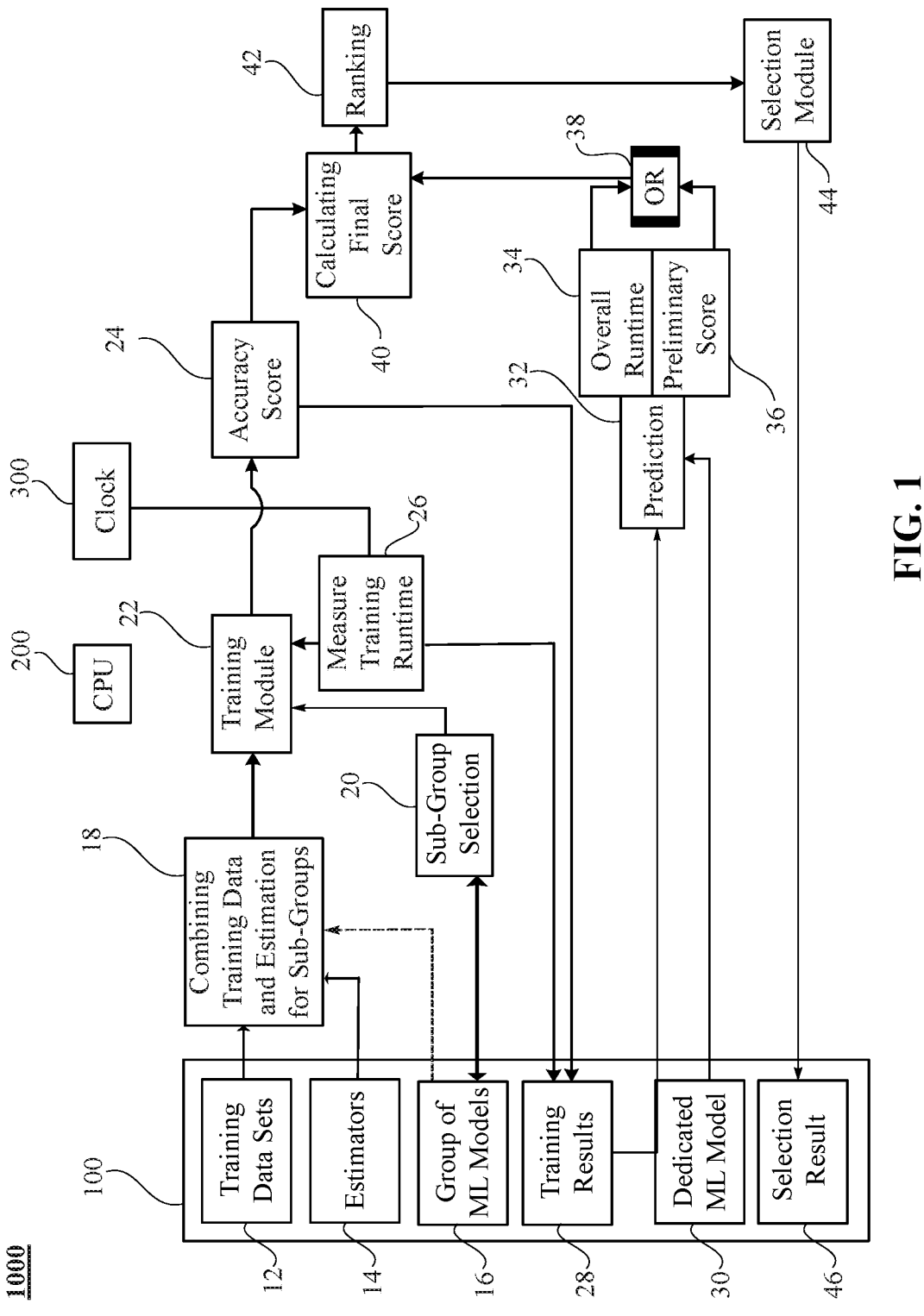
FIG. 1 illustrates an example of a computer system in accordance with the present subject matter.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to relates to the field of computer systems, and more specifically, to selecting a machine learning (ML) model out of a group of ML models on the basis of a training data set.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present subject matter may enhance the quality of the selection of an ML model with regard to a predetermined task. In particular, the present subject matter makes use of obtaining first values as to training runtime and of evaluating by using the first values in a predetermined predictive process a second value representing a runtime required for training the ML model with the complete training data set. These second values are then taken as a basis or as a part of a basis in calculating the final score for ranking the ML models. The idea of using values representing runtime may improve the quality of the selection since the final training with the complete training data set may be performed quicker than if only accuracy is focused on when selecting. Hence, generally the final results to be obtained with the selected ML models may be quicker at hand and the entire process may be speeded up.

The final score may be the only score calculated, but as well be a score that is derived from preliminary results, wherein these may themselves include an intermediate score.

According to some embodiments, for at least one of the ML models that are being trained, the respective training data are only a subset of the complete training data set. This may have the benefit that the training does not need to be complete as to this particular ML model before any score is determined. Hence, the final evaluation and selection may be quickly obtained.

According to some embodiments, for each of the ML models that are being trained, the respective training data are only a subset of the complete training data set. This may result in a considerably quicker evaluation of the second values for all of the ML models, the evaluating then implying a real prediction of a behavior in training of the ML models with the complete training data set. Hence, the prediction may be made without such complete training ever being needed to happen. Hence, prior to the selecting of one of the ML models, no complete training may be needed to take place. Then, the overall time needed may be low.

According to some embodiments, for each of the ML models that are being trained, a respective estimator is used. This relates to a specific stage of an ML model, wherein an estimator is here defined as an algorithm that transfers the input, i.e., the training data, to a single value (or at least to a less complex data set), and may thereby simplify the ML process.

According to some embodiments, at least one of the ML models is trained multiple times with the respective training data, each time using a different estimator. Thus, the method may result in using an optimum ML model by focusing on using an estimator perfectly or optimally suited to the remainder of the ML model.

According to some embodiments, the second value is an intermediate score $S_t$. Hence, calculating the final score step-wise may result in obtaining a score that has good properties such as to be best suited as a basis for selecting.

According to some embodiments, the method comprises calculating a further intermediate score Sa and using both intermediate scores to calculate the final score. The use of two intermediate scores may allow to tailor-shape the final score to the requirements of the task to be solved by the finally selected ML model.

According to some embodiments, the calculating of the final score $S_f$ includes adding the weighted intermediate score $S_t$ and the weighted further intermediate score $S_a$, $$S_f = w_t * S_t + w_a * S_a \qquad \text{(Equation 1)}$$

wherein $w_t$ and $w_a$ are respective weights such that $w_t$ is the weighting value of intermediate score $S_t$ and $w_a$ is the weighting value of the further intermediate score $S_a$. The linear combination of two scores may be regarded as the simplest manner of calculation and may lead to a quick evaluation of the final score with simple calculating means.

According to some embodiments, the intermediate score and the further intermediate score both are normalized to a value in the range of [0, 1], and $w_a$ is $(1-w_t)$. This may simplify the calculation and the determination of the weights, and may thus lead to more quickly obtaining the final score.

According to some embodiments, the weight $w_t$ is a function $w_t(ctr)$ of a control parameter ctr. This may allow to control the calculation of the final score rather quickly, for instance, without having to change a program code as such. The control parameter may itself be subject to machine learning.

According to some embodiments, the further intermediate score indicates an accuracy of the training (also referred to as a training accuracy) when training each ML model out of the group of ML models or out of a subgroup thereof with the respective training data of the training data set. Because the accuracy is oftentimes in hitherto existing methods of selecting calculated or elsewise determined, this aspect may help to most simply and efficiently provide the inventive use of runtime values as an add-on on existing systems.

According to some embodiments, the evaluating includes using a dedicated ML model different from the ML models in the group of ML models, the dedicated ML model predicting the runtime required for training the ML model with the complete training data. Here, one may refer to well-known predicting methods of the same technical field.

Thus, the respective technical system experts may be able to implement the calculation of the final score most efficiently.

According to some embodiments thereof, the dedicated ML model represents a regression model that is first trained itself before using the predicted runtime when evaluating the second value and when calculating the final score. This as well may be done in a rather short time, and thereby the overall calculation time may result to be low.

According to some embodiments thereof, the method comprises defining a control parameter ctr representing the contribution of a runtime component to the final score, as a variable, wherein a value of the variable is obtained upon training of the dedicated ML model. This may serve to simplify and to consequently quicken the process.

According to some embodiments, the runtime required for training is defined to include the time between providing input of training data and outputting a result of the training and the time for the evaluating of the first or second value itself. By not disregarding the time for the evaluating of the first or second value itself, the calculation may become rather precise.

FIG. 1 illustrates an example of a computer system 1000 in accordance with an example of the present disclosure. The computer system 1000 may include a memory 100, a processor 200 that may be or include hardware in the form of a Central Processing Unit, CPU, and the computer system 1000 may further include a clock 300.

The memory 100 may include a module or storage section 12 where training data sets are stored. The memory 100 may further include a module or storage section 14 where estimators are stored. The memory 100 may further include a module or storage section 16 where different ML models (which may be defined to be combined with an estimator out of the module or storage section 14) are stored. The memory 100 may include further modules and/or storage sections, some of which are described hereinunder.

The system 1000 may include different hardware, software or combined hardware/software modules described hereinbelow, wherein some modules might be realized by only hardware, some modules might be realized in only software and/or some modules might be realized by using hardware with software. A running module might for instance be obtained by loading software that may be stored in memory 100 or in other storage means to the CPU hardware of the processor 200.

The system 1000 may include a combining module 18 for combining selected training data out of training data sets that may be stored in storage section 12, and an estimator that may be stored in storage section 14. This may refer to real subgroups only out of group of the complete training data sets and the group of estimators. This may further optionally directly refer to an ML model out of a group of ML models that may be stored in storage section 16.

The system 1000 as well may include a selecting module 20 for selecting a sub-group out of a group of ML models that may be stored in storage section 16.

The system 1000 as well may include a training module 22 where ML models, e.g. those that may have been selected in selecting module 20, are trained by using selected training data, e.g., as received from combining module 18.

The system 1000 as well may include an accuracy score determination module 24 for determining an accuracy score of training an ML model, e.g., as a result of output of training module 22.

The system 1000 may as well include a training runtime measuring module 26, which obtains, e.g., by using signals from Clock 300, an indication as to the training runtime needed in the training done by, e.g., training module 22. Here, it may be provided that the training runtime is defined to include not only the time needed by the training itself, but as well the time for evaluating same.

The memory 100 may include a module or storage section 28 where the training results are stored, which may namely be those received from accuracy score determination module 24 and/or those received from training runtime measuring module 26.

The system 1000 may as well include a prediction module 32 that may be configured to receive stored training results from module or storage section 28 of the memory 100, and that may be able to predict, from data obtained with selected combinations of training data and estimators, a runtime required for training the ML model with the complete training data set. The prediction module 32 may be using itself an ML model. Specifically, it may use a dedicated ML model different from those ML models used else, e.g. those stored in storage section 16. Such dedicated ML model may be stored in a storage section 30 of the memory 100.

The output of a prediction module 32 may be an overall runtime that is output as 34 required for training a respective ML model with the complete training data set, and/or a preliminary or intermediate score that is output as 36. If both are output, in an ORing module 38, at least one of those may be selected.

The system 1000 may as well include a module 40 for calculating a final score that receives outputs from modules 24 and/or 38. In one aspect, thus the final score may be calculated from an accuracy score and an absolute overall runtime. In another aspect, the final score may be calculated from an accuracy score and a preliminary, or intermediate score that may be derived from a predicted runtime.

The system 1000 may as well include a ranking module that may receive results from module 40 for calculating a final score. The ranking module 40 outputs ranks for different ML modules.

The system 1000 may as well include a selection module 44 that selects the optimum ML model. The selection module my use ranks received from the ranking module 40.

The memory 100 may include a module or storage section 46 where the selection result is stored. The latter may be received from the selection module 44.

Figure 2:
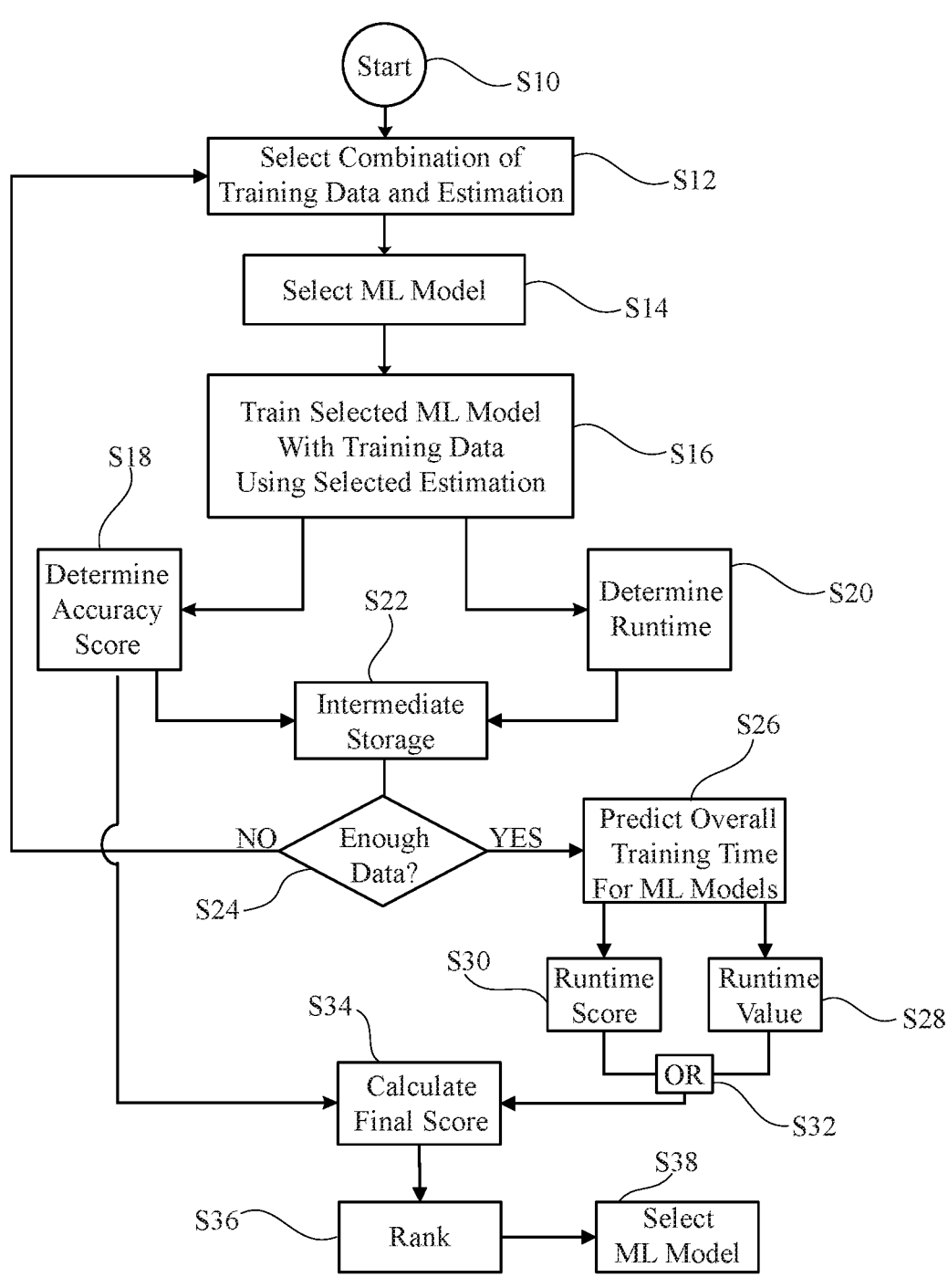
FIG. 2 illustrates an example of a flow diagram of a method in accordance with the present subject matter.

FIG. 2 illustrates an example of a flow diagram of a method 200 in accordance with the present subject matter. The method may start at S10. The method 200 may include an operation S12 of selecting a combination of training data and of an estimator, such as stored, e.g., in storage section 12 and/or storage section 14.

The method may further include an operation S14 of selecting an ML model out of a group of ML models such as, e.g., stored in storage section 16. The operation S14 may follow operation S12 or in an alternative precede same.

The method may further include an operation of training an ML model with specific data using a specific estimator. This may be, according to operation S16, a training of the ML model selected in operation S14 with the training data and using the estimator as selected in combination in operation S12.

The method my further include an operation S18 of determining an accuracy score, which may be determined using a manner known in the field.

The method may further include, in addition to operation S18 or as an alternative thereto, an operation S20 of determining the runtime of the training. The runtime may include a runtime required for the training operation S16 and as well include the evaluation time required in operation S20 itself.

The method then may include an operation S22 of intermediately storing the output of operation S18 and/or of operation S20, or any other result of a training operation S16. This may be stored in storage section 28.

The method may include an operation S24 of determining whether or not enough data has been gathered. This may be dependent on a counter that counts how many combinations of training data and estimator and with selected ML models, have been gone through, and whether a threshold for the counter has been reached. This determining may as well be dependent on the contents (accuracy score and/or runtime) that have already been determined, and may specifically be dependent of those contents or data that have been stored in operation S22.

The method may include returning to operation S12 if the outcome of the determining operation S24 is negative ("NO").

The method may include proceeding to a new operation S26 if the outcome of the determining operation S24 is in the affirmative ("YES").

Such new operation S26 may include predicting an overall runtime for those ML models for which training with the selected training data and estimator combinations had taken place. The overall runtime may include the runtime it takes or would take to train the respective ML model by using the complete training data sets. The predicting thus relates to a case before it is realized, or even without the case ever being realized. The predicting operation S26 may include using a dedicated ML model such as may be stored in storage section 30.

The method may further include providing in operation S28 a runtime value as an output. In addition, or as an alternative, the method may include calculating in operation S30 kind of score that is dependent in the runtime (and might be thus related to the runtime value).

The method may in case that both operations S28 and S30 are performed include a selection operation S32, with application of an exclusive or ("XOR") or of a non-exclusive or ("OR"). That is, operation S32 might output only one of the values obtained in operations S28 and S30, or possibly both of them.

The method may include a further operation S34 of calculating a final score using the output of operation S32 (or of either one of operations S28 and S30). Optionally, the final score may be calculated on the basis of an accuracy score such as may be determined in operation S18.

For instance, if the final score is indicated as $S_f$ and if the runtime value output in operation S28 is $R_t$, and if the accuracy score determined in operation S18 is $S_a$, then the equation $$S_f = S_a w_{Rt} {}^* R_t \qquad \text{(Equation 2)}$$

wherein $w_{Rt}$ is a weight for the runtime, might be true.

However, the runtime score $S_t$ calculated in operation S30 might as well be used, e.g., in equation:

$$S_f = w_a {}^* S_a + w_t {}^* S_t \qquad \text{(Equation 3)}$$

wherein $w_a$ and $w_t$ are weights. These might undergo an operation of renormalization resulting in Sf being selected in the range [0,1].

If $S_a$ and $S_t$ are themselves each defined in the range [0,1], one may as well simply use the equation:

$$S_f = (1-w_t) {}^* S_a + w_t {}^* S_t = w_a {}^* S_a + (1-w_a) {}^* S_t \qquad \text{(Equation 4)}$$

The method may then use the final score in an operation S36 for a ranking of the combination of estimators and ML models.

The method may end by selecting the combination of an ML model with an estimator for which the ranking is the best (or highest) in an operation S38.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Specifically, the processor described herein may be provided as a hardware device, a software device, or a combination of software and hardware.

The memory referred to herein and/or the computer program product may be any tangible device that can retain and store data and store instructions for use by an instruction execution device. The memory or computer program product may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

iterating through selection and training of combinations of each machine learning model within a plurality of machine learning models and each estimator within a plurality of estimators until a threshold counter value of training data is satisfied, wherein a different estimator within the plurality of estimators is used to train each machine learning model, and wherein the threshold counter value is dependent on a predetermined accuracy score and a predetermined runtime value, and wherein the training further comprises:

obtaining a first value representing a first required runtime for training the machine learning model, wherein the first required runtime includes time between providing input of training data and outputting a result of the training and time for evaluating of the first value;

evaluating, based on the first value, a second value representing a second required runtime for training the machine learning model with a complete training data set, wherein the second value is an intermediate score $S_t$; and calculating a final score for each machine learning model in a group of machine learning models, wherein the calculating is performed on a basis of the second values for the machine learning models;

calculating a further intermediate score $S_a$ representing an accuracy of the training, and wherein the calculating further comprises:

weighting the intermediate score $S_t$;

weighting the further intermediate score $S_a$; and calculating of the final score $S_f$ such that $S_f = w_t * S_t + w_a * S_a$, wherein intermediate weight $w_t$ weights intermediate score $S_t$, and wherein further intermediate weight $w_a$ weights further intermediate score $S_a$, and wherein $w_a$ is $(1-w_t)$, and wherein the weight $w_t$ is a function $w_t(ctr)$ of a control parameter ctr;

calculating a final score St using intermediate score $S_t$ and further intermediate score $S_a$;

ranking the machine learning models based on the final score to obtain ranks;

selecting the machine learning model that has obtained a highest rank in the ranking;

implementing a dedicated machine learning model; and predicting a runtime of a second training of each machine learning model using the complete training data set and estimator combinations.

2. A method of selecting a machine learning model, the method comprising:

iterating through selection and training of combinations of each machine learning model within a plurality of machine learning models and each estimator within a plurality of estimators until a threshold counter value of training data is satisfied, wherein a different estimator within the plurality of estimators is used to train each machine learning model, and wherein the threshold counter value is dependent on a predetermined accuracy score and a predetermined runtime value, and wherein the training further comprises:

obtaining a first value representing a first required runtime for training the machine learning model, wherein the first required runtime includes time between providing input of training data and outputting a result of the training and time for evaluating of the first value;

evaluating, based on the first value, a second value representing a second required runtime for training the machine learning model with a complete training data set, wherein the second value is an intermediate score $S_t$; and calculating a final score for each machine learning model in a group of machine learning models, wherein the calculating is performed on a basis of the second values for the machine learning models;

calculating a further intermediate score $S_a$ representing an accuracy of the training, and wherein the calculating further comprises:

weighting the intermediate score $S_t$;

weighting the further intermediate score $S_a$; and calculating of the final score $S_f$ such that $S_f = w_t * S_t + w_a * S_a$, wherein intermediate weight $w_t$ weights intermediate score $S_t$, and wherein further intermediate weight $w_a$ weights further intermediate score $S_a$, and wherein $w_a$ is $(1-w_t)$, and wherein the weight $w_t$ is a function $w_t(ctr)$ of a control parameter ctr;

calculating a final score $S_t$ using intermediate score $S_t$ and further intermediate score $S_a$;

ranking the machine learning models based on the final score to obtain ranks;

selecting the machine learning model that has obtained a highest rank in the ranking;

implementing a dedicated machine learning model; and predicting a runtime of a second training of each machine learning model using the complete training data set and estimator combinations.

3. The method of claim 2, wherein:

the training data is only a subset of the complete training data set for at least one of the machine learning models being trained.

4. The method of claim 3, wherein:

the training data is only a subset of the complete training data set for each of the machine learning models being trained.

5. The method of claim 2, wherein:

the intermediate score $S_t$ and the further intermediate score $S_a$ are normalized to a value in a range of [0, 1].

6. The method of claim 2, wherein:

the further intermediate score $S_a$ indicates a training accuracy when training each machine learning model with the respective training data of the training data set.

7. The method of claim 2, wherein:

when evaluating the second value and when calculating the final score, the dedicated machine learning model represents a regression model trained before using the predicted runtime.

8. The method of claim 7, further comprising:

defining a control parameter ctr representing a contribution of a runtime component to the final score, as a variable, wherein a value of the variable is obtained upon training of the dedicated machine learning model.

9. A computer program product, the computer program product comprising a computer readable storage medium having program instructions embodied therewith, said program instructions executable by a processor to cause said processor to perform a function of selecting a machine learning model, the function comprising:

iterating through selection and training of combinations of each machine learning model within a plurality of machine learning models and each estimator within a plurality of estimators until a threshold counter value of training data is satisfied, wherein a different estimator within the plurality of estimators is used to train each machine learning model, and wherein the threshold counter value is dependent on a predetermined accuracy score and a predetermined runtime value, and wherein the training further comprises:

obtaining a first value representing a first required runtime for training the machine learning model, wherein the first required runtime includes time between providing input of training data and outputting a result of the training and time for evaluating of the first value;

evaluating, based on the first value, a second value representing a second required runtime for training the machine learning model with a complete training data set, wherein the second value is an intermediate score $S_t$; and calculating a final score for each machine learning model in a group of machine learning models, wherein the calculating is performed on a basis of the second values for the machine learning models;

calculating a further intermediate score $S_a$ representing an accuracy of the training, and wherein the calculating further comprises:

weighting the intermediate score $S_t$;

weighting the further intermediate score $S_a$; and calculating of the final score Sr such that $S_f = w_t * S_t + w_a * S_a$, wherein intermediate weight $w_t$ weights intermediate score $S_t$, and wherein further intermediate weight $w_a$ weights further intermediate score $S_a$, and wherein $w_a$ is $(1-w_t)$, and wherein the weight $w_t$ is a function $w_t(ctr)$ of a control parameter ctr;

calculating a final score St using intermediate score $S_t$ and further intermediate score $S_a$;

ranking the machine learning models based on the final score to obtain ranks;

selecting the machine learning model that has obtained a highest rank in the ranking;

implementing a dedicated machine learning model; and predicting a runtime of a second training of each machine learning model using the complete training data set and estimator combinations.

* * * * *